Patented May 16, 1933

1,909,879

UNITED STATES PATENT OFFICE

RALPH H. McKEE, OF JERSEY CITY, NEW JERSEY

INSECTICIDE AND FUNGICIDE

No Drawing.   Application filed January 18, 1930. Serial No. 421,810.

This invention relates to insecticides and fungicides and is a specific modification of the invention described and claimed in my co-pending application Serial No. 19,157, filed March 28th, 1925, now Patent No. 1,744,324 issued January 21, 1930.

The principal object of this invention is to provide an insecticide and fungicide containing a distillate fraction of shale oil distilling between approximately 150° and 300° C., in the form of an oil-in-water emulsion in which the oil droplets or globules are not substantially smaller than 4 microns in diameter.

Other objects and advantages of the invention will become apparent during the course of the following description.

In the prior practice of preparing oil insecticides it has generally been thought advisable to provide an emulsion in which the oil globules are very small, preferably less than 1 micron in diameter. A soap emulsion of shale oil kerosene of this type is described in my copending application referred to above. However, I have now found that superior results are obtained if the oil emulsion is so prepared that the oil globules in the emulsion are of a materially larger size, for example, 4 or 5 microns in diameter. The present invention provides an insecticide and fungicide in the form of an emulsion of this type, and tests have demonstrated the improved results which are obtained by its use.

In its broad aspects, the present invention contemplates an insecticide and fungicide containing a distillate fraction of shale oil distilling between approximately 150° and 300° C., in the form of an oil-in-water emulsion in which the oil globules are not substantially smaller than 4 microns in diameter. In the preferred embodiment of the invention the final product consists of an emulsion of shale oil kerosene high in nitrogen bases and containing saturated and unsaturated hydrocarbons, the oil globules in which emulsion are 4 to 5 microns in diameter.

As is set forth in my Patent No. 1,744,324 referred to above, shale oil from certain shales, such as those of Colorado and Utah, are rich in nitrogen bases, and this is particularly true of the oil which is obtained by distilling the crude shale oil between 150° and 300° C. These bases are largely derivatives of pyridine, typical derivatives being trimethyl pyridine and 2, 6 methyl, 4 allyl pyridine. In some instances there may be quinoline bases present, but the principal ones are, as stated, pyridine derivatives. In addition, an oil distilled within the range specified contains a large proportion of unsaturated hydrocarbons and a minor proportion of saturated hydrocarbons. A distillate fraction of this character has been found to be an advantageous insecticide and fungicide, as fully set forth in my patent mentioned.

However, in such patent reference is made to the use of a distillate fraction of shale oil distilling between 150° and 350° C., and particularly the 150°–300° C. fraction which may be termed shale oil kerosene, in the form of a relatively permanent emulsion. In preparing such an emulsion, soap in an amount equal to approximately 50 per cent of the weight of the oil to be emulsified would be used as an emulsifying agent, and the emulsion composite produced, when diluted so that it would give an emulsion having a concentration of 1 per cent of oil, would have oil globules less than 1 micron in diameter.

In the present invention an emulsion of a similar distillate is prepared but the process of forming the emulsion is modified from standard practice so that the emulsion composite produced, when diluted to provide an emulsion having a concentration of 1 per cent of oil, would have oil globules not substantially smaller than 4 microns in diameter, and ordinarily 4 or 5 microns in diameter.

If desired, the nitrogen bases present in shale oil may be extracted from the oil as by washing with dilute hydrochloric, sulfuric or similar acids and then working up the solution obtained to recover the free bases, and the recovered bases mixed with an oil carrying a high percentage, say 50 to 70 per cent of unsaturated hydrocarbons, such as ordinary shale oil. The resulting product may then be emulsified in accordance with this invention. However, for the sake of simplicity I prefer to employ a crude distillate fraction of the character referred to above.

According to the preferred procedure of preparing the insecticide and fungicide contemplated by the present invention, a distillate fraction of shale oil distilling between approximately 150° and 350° C., and preferably the 150°–300° C. or kerosene fraction, is mixed with water and an emulsifying agent, such as sulfite waste liquor, a soap, glue, calcium caseinate, a colloidal clay, such as bentonite, or the like, and preferably sulfite waste liquor, the emulsifying agent being employed in such an amount that a proper and uniform emulsion composite will not be produced if the mass is agitated at room temperature but will be produced if the agitation is conducted when the mass is at a temperature of approximately 70° C. or above. The mass thus prepared is then agitated at a temperature of approximately from 70° to 100° C. to form a substantially uniform emulsion composite. When this procedure is followed the emulsion composite produced when diluted to provide an emulsion having a concentration of approximately 1 per cent of oil will have oil globules of approximately 4 to 5 microns in diameter.

As stated above, I prefer to employ sulfite waste liquor as the emulsifying agent in the practice of my invention. This material is the commercial product obtained by evaporating the waste liquor left after making sulfite paper pulp from wood. It is a commercial product sold for briquetting coal and for use as an adhesive. Its principal constituent is a colloid which is generally given the name of calcium lignosulfonate. In addition, the product contains some sugars and gums.

A soap such as fish oil soap may also be advantageously used as the emulsifying agent when soft water is available. However, soaps are precipitated by hard water and hence are apt to be somewhat irregular in their effect on the spray as used. Sulfite waste liquor on the other hand, has the advantage that it can be used equally well when hard or soft water is used to dilute the emulsion composite and hence its use is recommended. When either of these emulsifying agents, or other similar agents of the character referred to above, is used it is important that the minimum amount of material that will produce an emulsion under the conditions specified be employed in order to secure the most advantageous results.

As a typical example of the method employed in preparing an insecticide and fungicide according to the present invention, 600 cc. of shale oil kerosene which is rich in nitrogen bases and contains saturated and unsaturated hydrocarbons are mixed with approximately 400 cc. of water carrying approximately 2½ grams of sulfite waste liquor calculated on the dry basis. In commercial practice it is most convenient to use the sulfite waste liquor in the commercial form containing 50 per cent solids and in this case 600 cc. of shale oil kerosene would be mixed with 395 cc. of water and 5 cc. of the sulfite waste liquor. The mass prepared in either of the ways mentioned is then heated to approximately 80° C. and thereafter vigorously stirred to form an emulsion composite.

The resulting product may then be used as a commercial product for shipping but in actual use the composite is diluted with water, preferably to approximately 60 liters in the case of the specific examples mentioned, to provide a 1 per cent oil-in-water emulsion which is used as a spray for foliage or, if desired, for treating wood or other material to be protected against fungus growth. When the material is used as an insecticide it will be found to effect a large "kill" in a relatively short time without burning or injuring the foliage. The outside or shell of an insect is waxy or greasy and when the emulsion is sprayed on the leaf carrying the insect it readily wets the insect as the emulsion breaks, that is, the oil globules coalesce to form an oil skin over the insect and as a result it is poisoned and quickly dies.

When a soap is employed as an emulsifying agent, 600 cc. of the distillate fraction to be employed are mixed with approximately 400 cc. of water carrying a soap in an amount equal to 0.5 per cent by weight of the oil, both calculated on the dry basis. The resulting mass is then heated to an elevated temperature as described above and vigorously stirred. This provides a suitable composite which may be diluted with water to provide the desired spray.

Glue may also be advantageously used as an emulsifying agent and when such material is used it is preferably added to the distillate fraction and water in an amount equal to approximately 0.5 per cent of the weight of the oil, both materials calculated on the dry basis.

The product prepared in accordance with this invention posseses all of the desirable properties possessed by the product which is described and claimed in my Patent No. 1,744,324, and has the additional advantage that it is more positive and rapid in its action.

While I have described in detail the preferred embodiment of my invention it is to be understood that the details of procedure may be variously modified without departing from the spirit of the invention or the scope of the subjoined claims.

I claim:

1. An oil insecticide in the form of an oil-in-water emulsion in which the oil globules are at least as large as approximately 4 microns in diameter.

2. An insecticide and fungicide comprising an oil-in-water emulsion of a distillate fraction of shale oil distilling between approximately 150° and 300° C., in which the oil globules are at least as large as approximately 4 microns in diameter.

3. An insecticide and fungicide comprising an oil-in-water emulsion of the 150°–300° C. distillate fraction of crude shale oil, in which the oil globules are at least as large as approximately 4 microns in diameter.

4. An insecticide and fungicide comprising an oil-in-water emulsion of a distillate fraction of shale oil distilling between approximately 150° and 300° C. and containing nitrogen bases, unsaturated hydrocarbons and saturated hydrocarbons, in which the oil globules are at least as large as approximately 4 microns in diameter.

5. An insecticide and fungicide in the form of an oil-in-water emulsion containing nitrogen bases of shale oil and an oil containing a major proportion of unsaturated hydrocarbons, the oil globules of the emulsion being approximately 4 to 5 microns in diameter.

6. A composition of the character described comprising an emulsion composite of a distillate fraction of shale oil distilling between approximately 150° and 300° C., capable of yielding an emulsion in which the oil globules are at least as large as approximately 4 microns in diameter when diluted to provide a 1 per cent oil-in-water emulsion.

7. A composition of the character described comprising an emulsion composite of the 150°–300° C. distillate fraction of crude shale oil capable of yielding an emulsion in which the oil globules are at least as large as approximately 4 microns in diameter when diluted to provide a 1 per cent oil-in-water emulsion.

8. A composition of the character described comprising an emulsion composite of a distillate fraction of shale oil distilling between approximately 150° and 300° C. and containing nitrogen bases, unsaturated hydrocarbons and saturated hydrocarbons, capable of yielding an emulsion in which the oil globules are at least as large as approximately 4 microns in diameter when diluted to provide a 1 per cent oil-in-water emulsion.

9. An insecticidal emulsion composite containing nitrogen bases of shale oil and an oil containing a major proportion of unsaturated hydrocarbons, which is capable of yielding an emulsion in which the oil globules are approximately 4 to 5 microns in diameter when diluted to provide a 1 per cent oil-in-water emulsion.

10. The process of preparing an insecticide and fungicide which comprises mixing with water and a distillate fraction of shale oil distilling between approximately 150° and 300° C., an emulsifying agent in an amount which is incapable of producing a uniform emulsion composite when the mass is agitated at normal atmospheric temperature but is effective for producing a uniform emulsion composite when the mass is agitated at 70° or above, and thereafter agitating the mass at a temperature of from 70° to 100° C.

11. The process of preparing an insecticide and fungicide which comprises mixing with water and a 150°–300° C. distillate fraction of crude shale oil an emulsifying agent in an amount which is incapable of producing a uniform emulsion composite when the mass is agitated at normal atmospheric temperature but is effective for producing a uniform emulsion composite when the mass is heated to approximately 80° C. and vigorously agitated, heating the mass to approximately 80° C., and vigorously agitating the heated mass.

In testimony whereof I affix my signature.

RALPH H. McKEE.